United States Patent
Strauss et al.

[11] Patent Number: 6,114,266
[45] Date of Patent: Sep. 5, 2000

[54] COPPER COMPLEXES FOR NCO AND OLEFIN ADSORPTION

[75] Inventors: Steven Howard Strauss; Oleg Gennadievich Polyakov; John Wesley Hammel; Svetlana Mechaelovna Ivanova; Sergei Vladimirovich Ivanov; Matthew David Havighurst, all of Fort Collins, Colo.

[73] Assignee: Air Products and Chemicals, Inc., Allentown, Pa.

[21] Appl. No.: 09/300,607

[22] Filed: Apr. 27, 1999

[51] Int. Cl.$^7$ ............... B01J 29/04; B01J 20/22; C01D 7/00; B01D 50/00; C07F 9/70
[52] U.S. Cl. ............ 502/62; 502/401; 423/415.2; 422/180; 556/70
[58] Field of Search ............ 423/415.2; 422/180; 556/70; 502/401, 62

[56] References Cited

U.S. PATENT DOCUMENTS

| | | | |
|---|---|---|---|
| 3,944,440 | 3/1976 | Franz | 148/6.3 |
| 4,387,222 | 6/1983 | Koshar | 544/4 |
| 4,917,711 | 4/1990 | Xie et al. | 55/68 |
| 5,258,571 | 11/1993 | Golden et al. | 585/829 |
| 5,300,271 | 4/1994 | Golden et al. | 423/247 |
| 5,514,493 | 5/1996 | Waddell et al. | 429/199 |
| 5,691,081 | 11/1997 | Krause et al. | 429/192 |

OTHER PUBLICATIONS

Souma et al. 15 Inorg. Chem. 968 (1976).
Meyer et al. 117 J. Am. Chem. Soc. 4071 (1995).
Rack et al. 35 Inorg. Chem. 277 (1996).
Hurlbert et al. 116 J. Am. Chem. Soc. 10003 (1994).
Rack et al. 52 Appl. Spectroscopy 1035 (1998).
Strauss, "Nonclassical Metal Carbonyls" 10 Chemtracts–Inorganic Chemistry 77 (1997).
Strauss, S. H., The Search for Larger and More Weakly Coordinating Anions, Chem. Rev. 1993, 93, 927–942.
Rack, et al. Infrared and Manometric Evidence for the Formation of the [Ag(CO)3]+ Complex Ion at High Pco, J. Chem. Soc., Chem. Commun., 1994 pp. 685–686.
Rack, et al. [Cu(CO)n]+Complex Ions in the Solid State (n=1,2,3), Inorg. Chem. 1996, 35, pp. 277–278.

*Primary Examiner*—Steven P. Griffin
*Assistant Examiner*—Jonas N. Strickland
*Attorney, Agent, or Firm*—Geoffrey L. Chase

[57] ABSTRACT

A solid state composition is provided having the formula $Cu(A)_n Z$, where A is CO or olefin, n>1 and Z is a unitary or composite monovalent anion. Further provided are an apparatus adapted to adsorb and a method for adsorbing an adsorbate A from a fluid mixture. The apparatus and method employ an adsorbent having the formula $Cu(A)_n Z$, where A is CO or olefin, n>0 and Z is a unitary or composite monovalent anion. Z can be selected from the group consisting of: a) $X^-$ where $X^-$ is $BF_4^-$, $PF_6^-$ or $SbF_6^-$; b) $(Al_x(OR)_y)^-$ where R is fluoroalkyl or perfluoroalkyl, and x is 0 and y is 1, or x is 1 and y is 4; c) $(RCO_2)^-$ where R is alkyl, fluoroalkyl, perfluoroalkyl, aryl, fluoroaryl or perfluoroaryl; d) $(RSO_3)^-$ where R is alkyl, fluoroalkyl, perfluoroalkyl, aryl, fluoroaryl or perfluoroaryl; e) $(H(RCO_2)_2)^-$ where R is alkyl, fluoroalkyl, perfluoroalkyl, aryl, fluoroaryl or perfluoroaryl; f) $(H(RSO_3)_2)^-$ where R is alkyl, fluoroalkyl, perfluoroalkyl, aryl, fluoroaryl or perfluoroaryl; g) $(N(SO_2R)_xR'_y)^-$ where R is fluoroalkyl, perfluoroalkyl, aryl, fluoroaryl or perfluoroaryl, R' is alkyl, fluoroalkyl, perfluoroalkyl, aryl, fluoroaryl or perfluoroaryl, x+y=2 and x=1 or 2; h) $(C(SO_2R_xR'_y)^-$ where R is fluoroalkyl, perfluoroalkyl, aryl, fluoroaryl or perfluoroaryl, R' is hydrogen, alkyl, fluoroalkyl, perfluoroalkyl, aryl, fluoroaryl or perfluoroaryl, x+y=3 and x=1, 2 or 3; i) $(CB_{11}H_{12-m}X_m)^-$ where m is from 0 to 12, and X is at least one member selected from the group consisting of halogen, alkyl, fluoroalkyl, perfluoroalkyl, aryl, fluoroaryl and perfluoroaryl; j) $(CB_9H_{10-m}X_m)^-$ where m is from 0 to 10, and X is at least one member selected from the group consisting of halogen, alkyl, fluoroalkyl, perfluoroalkyl, aryl, fluoroaryl and perfluoroaryl; and k) $(CB_{11}F_{11}R)^-$ where R is alkyl, fluoroalkyl, perfluoroalkyl, aryl, fluoroaryl, perfluoroaryl or ammonium.

35 Claims, No Drawings

COPPER COMPLEXES FOR NCO AND OLEFIN ADSORPTION

STATEMENT REGARDING FEDERALLY SPONSORED RESEARCH OR DEVELOPMENT

This invention was made with government support under National Science Foundation Grant No. CHE-9628769 (Colorado State University Account No. 5-33149). The government has certain rights in this invention.

CROSS-REFERENCE TO RELATED APPLICATIONS

Not applicable.

BACKGROUND OF THE INVENTION

This invention relates to copper-based adsorbents adapted to adsorb: (1) CO with CO/Cu ratios greater than 1.0, and/or (2) olefins with olefin/Cu ratios greater than 1.0.

The ability of solids or solutions containing copper(I) compounds to reversibly adsorb (or absorb) CO has led to a vital and expanding industry—the preparation of high purity CO from synthesis gas. Until recently, it was believed that the limiting CO:Cu stoichiometry for any copper carbonyl was 1:1, as exemplified by the following reaction scheme for copper(I) chloride:

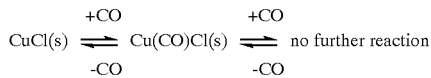

The solid phase can be bulk, crystalline CuCl, small crystallites of CuCl dispersed on high-surface-area materials, or atomically dispersed CuCl on high-surface-area materials.

Several developments cast doubt on the above scheme and on the general notion that $Cu^+$ can form only monocarbonyls. One development was the observation by Souma et al. in 15 Inorg. Chem. 968 (1976) that solutions of $Cu_2O$ in neat $HSO_3F$, $BF_3 \cdot H_2O$, and other strong acids absorbed up to four equivalents of CO per equivalent of Cu; the exact stoichiometry being dependent on temperature and pressure. Based on these observations, IR and Raman spectra of these solutions were interpreted in terms of the following set of equilibria:

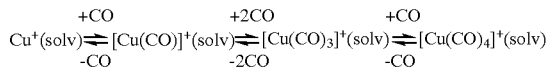

None of these carbonyl complexes could be isolated as solids. For reasons that are not clear, other possible interpretations of the data, especially the existence of the dicarbonyl complex $[Cu(CO)_2]^+$, were not considered.

Meyer et al. in 117 J. Am. Chem. Soc. 4071 (1995) observed that free, gaseous $Cu^+$ has an affinity for four CO molecules. Bond enthalpies for the $Cu^+$—CO, $(CO)Cu^+$—CO, $(CO)_2Cu^+$—CO, and $(CO)_3Cu^+$—CO bonds were determined to be 36(2), 41(1), 18(1), and 13(1) kcal $mol^{B1}$, respectively.

More recently, one of the instant inventors (Steven H. Strauss) and his colleagues disclosed that the literature compound $CuAsF_6$ will adsorb up to three equivalents of CO at pressures less than one atmosphere. See Rack et al. 35 Inorg. Chem. 277 (1996). Three distinct solid compounds were formed depending on the pressure—$[Cu(CO)][AsF_6]$, $[Cu(CO)_2][AsF_6]$, and $[Cu(CO)_3][AsF_6]$—and were characterized by manometry and by IR and Raman spectroscopy. The formation of the dicarbonyl compound $[Cu(CO)_2][AsF_6]$ suggests that the complex $[Cu(CO)_2]^+$ is also present in Souma's system and that IR and Raman spectra of strongly acidic solutions containing $[Cu(CO)_n]^+$ ions should be re-examined and re-interpreted.

Despite the foregoing developments, it is desired to provide additional copper (I) polycarbonyls.

It is also desired to provide a CO adsorbent comprising copper (I) compounds that adsorb in excess of one CO per copper to form copper (I) polycarbonyls.

It is further desired to provide a gas adsorption apparatus comprising a copper-based adsorbent that adsorbs in excess of one CO per copper to form copper (I) polycarbonyls.

It is still further desired to provide a method of more efficiently adsorbing CO to a copper-based adsorbent in a gas adsorption process.

In addition, it is desired to provide compositions adapted to adsorb olefins, a method for separating olefins from hydrocarbons and an apparatus adapted to practice the method.

All references cited herein are incorporated herein by reference in their entireties.

BRIEF SUMMARY OF THE INVENTION

Accordingly, the invention provides a solid state composition having the formula $Cu(A)_nZ$, where A is carbonyl or olefin, n>1 and Z is a unitary or composite monovalent anion.

Also provided is a solid state composition having the formula $Cu(A)_nZ$, where A is carbonyl or olefin, $n \geq 0$ and Z is selected from the group consisting of:

a) $X^-$, where $X^-$ is $BF_4^-$, $PF_6^-$ or $SbF_6^-$;

b) $(RCO_2)^-$, where R is alkyl, aryl or fluoroaryl;

c) $(H(RCO_2)_2)^-$ where R is alkyl, fluoroalkyl, perfluoroalkyl, aryl, fluoroaryl or perfluoroaryl;

d) $(H(RSO_3)_2)^-$ where R is alkyl, fluoroalkyl, perfluoroalkyl, aryl, fluoroaryl or perfluoroaryl;

e) $(N(SO_2R)_x R'_y)^-$ where R is fluoroalkyl, perfluoroalkyl, aryl, fluoroaryl or perfluoroaryl, R' is alkyl, fluoroalkyl, perfluoroalkyl, aryl, fluoroaryl or perfluoroaryl, x+y=2 and x=1 or 2; and f) $(C(SO_2R)_x R'_y)^-$ where R is fluoroalkyl, perfluoroalkyl, aryl, fluoroaryl or perfluoroaryl, R' is hydrogen, alkyl, fluoroalkyl, perfluoroalkyl, aryl, fluoroaryl or perfluoroaryl, x+y=3 and x=1, 2 or 3.

Further provided is an apparatus adapted to adsorb an adsorbate A from a fluid mixture, said apparatus comprising an adsorbent having the formula $Cu(A)_nZ$, where A is carbonyl or olefin, $n \geq 0$ and Z is a unitary or composite monovalent anion, said adsorbent being adapted to adsorb more than one adsorbate A per Cu.

Still further provided is a method for adsorbing an adsorbate A from a fluid mixture, said method comprising: providing an adsorption apparatus according to the invention, providing a fluid mixture containing an adsorbate, contacting said fluid mixture with said adsorbent of said apparatus, and adsorbing said adsorbate to said adsorbent, wherein said adsorbent adsorbs in excess of one said adsorbate per Cu in said adsorbent.

BRIEF DESCRIPTION OF SEVERAL VIEWS OF THE DRAWINGS

Not applicable.

DETAILED DESCRIPTION OF THE INVENTION

The invention encompasses copper (I) compounds that adsorb more than one equivalent of CO per equivalent of Cu and copper (I) compounds that adsorb more than one equivalent of olefin per equivalent of Cu.

Accordingly, the invention provides a composition having the formula $Cu(A)_nZ$, where A is carbonyl or olefin, n>1 and Z is a unitary or composite monovalent anion other than $(AsF_6)^-$, $(alkyl\text{-}CB_{11}F_{11})^-$ or zeolite.

Compositions of the invention are preferably adapted to exist in a solid state when n>1. That is, the composition in polycarbonyl form is preferably a bulk solid or supported by a solid substrate. Suitable solid substrates include, e.g., zeolite, alumina, silica, polystyrene, copolymers of styrene and other monomers, or other organic polymers. The composition can, e.g., be provided on a solid substrate in accordance with the teachings of U.S. Pat. No. 4,917,711. It is also preferable for the composition to be in a solid state when n is 0 or 1.

The value n in the foregoing formula represents the number of adsorbates A (i.e., carbonyls or olefins) incorporated into the composition. Compositions of the invention must be capable of existing in a polycarbonyl state having more than one adsorbate per copper. Preferably, n is more than 1, more preferably at least 2, and even more preferably at least 3.

Z is preferably a weakly coordinating monovalent anion. In preferred embodiments, Z is a composite anion comprising a plurality of anionic fragments bonded to a cation with a positive charge one unit less than a sum of negative charges of said anionic fragments. In embodiments, Z comprises an organic group or a halide.

When n>1, Z is preferably selected from the group consisting of:

a) $X^-$ where $X^-$ is $BF_4^-$, $PF_6^-$ or $SbF_6^-$;
b) $(Al_x(OR)_y)^-$ where R is fluoroalkyl or perfluoroalkyl, and x is 0 and y is 1, or x is 1 and y is 4;
c) $(RCO_2)^-$ where R is alkyl, fluoroalkyl, perfluoroalkyl, aryl, fluoroaryl or perfluoroaryl;
d) $(RSO_3)^-$ where R is alkyl, fluoroalkyl, perfluoroalkyl, aryl, fluoroaryl or perfluoroaryl;
e) $(H(RCO_2)_2)^-$ where R is alkyl, fluoroalkyl, perfluoroalkyl, aryl, fluoroaryl or perfluoroaryl;
f) $(H(RSO_3)_2)^-$ where R is alkyl, fluoroalkyl, perfluoroalkyl, aryl, fluoroaryl or perfluoroaryl;
g) $(N(SO_2R)_x R'_y)^-$ where R is fluoroalkyl, perfluoroalkyl, aryl, fluoroaryl or perfluoroaryl, R' is alkyl, fluoroalkyl, perfluoroalkyl, aryl, fluoroaryl or perfluoroaryl, x+y=2 and x=1 or 2;
h) $(C(SO_2R)_x R'_y)^-$ where R is fluoroalkyl, perfluoroalkyl, aryl, fluoroaryl or perfluoroaryl, R' is hydrogen, alkyl, fluoroalkyl, perfluoroalkyl, aryl, fluoroaryl or perfluoroaryl, x+y=3 and x=1, 2 or 3;
i) $(CB_{11}H_{12-m}X_m)^-$ where m is from 0 to 12, and X is at least one member selected from the group consisting of halogen, alkyl, fluoroalkyl, perfluoroalkyl, aryl, fluoroaryl and perfluoroaryl;
j) $(CB_9H_{10-m}X_m)^-$ where m is from 0 to 10, and X is at least one member selected from the group consisting of halogen, alkyl, fluoroalkyl, perfluoroalkyl, aryl, fluoroaryl and perfluoroaryl; and
k) $(CB_{11}F_{11}R)^-$ where R is alkyl, fluoroalkyl, perfluoroalkyl, aryl, fluoroaryl, perfluoroaryl or ammonium.

In certain embodiments of the composition where n is more than 1, Z is $(CB_{11}H_{12-m}X_m)^-$, where $CB_{11}H_{12-m}$ is 1-carba-closo-dodecaborate, and X is chlorine, bromine, iodine or fluorine. In other embodiments, Z is $(CB_9H_{10-m}X_m)^-$, where $CB_9H_{10-m}$ is 1-carba-closo-decaborate, and X is chlorine, bromine, iodine or fluorine. In still other embodiments, Z is $(1\text{-}R\text{—}CB_{11}H_{12-m}X_m)^-$, where $CB_{11}H_{12-m}$ is 1-carba-closo-dodecaborate, R is alkyl, fluoroalkyl, perfluoroalkyl, aryl, fluoroaryl or perfluoroaryl, and X is chlorine, bromine, iodine or fluorine.

Preferably, the composition is supported on a substrate, which is preferably a zeolite.

Preferably, A in the formula $Cu(A)_nZ$ is carbonyl.

The invention also provides a solid state composition having the formula $Cu(A)_n Z$, where A is carbonyl or olefin, $n \geq 0$ and Z is selected from the group consisting of:

a) $X^-$, where X is $BF_4^-$, $PF_6^-$ or $SbF_6^-$;
b) $(RCO_2)^-$, where R is alkyl, aryl or fluoroaryl;
c) $(H(RCO_2)_2)^-$ where R is alkyl, fluoroalkyl, perfluoroalkyl, aryl, fluoroaryl or perfluoroaryl;
d) $(H(RSO_3)_2)^-$ where R is alkyl, fluoroalkyl, perfluoroalkyl, aryl, fluoroaryl or perfluoroaryl;
e) $(N(SO_2R)_x R'_y)^-$ where R is fluoroalkyl, perfluoroalkyl, aryl, fluoroaryl or perfluoroaryl, R' is alkyl, fluoroalkyl, perfluoroalkyl, aryl, fluoroaryl or perfluoroaryl, x+y=2 and x=1 or 2; and
f) $(C(SO_2R)_x R'_y)^-$ where R is fluoroalkyl, perfluoroalkyl, aryl, fluoroaryl or perfluoroaryl, R' is hydrogen, alkyl, fluoroalkyl, perfluoroalkyl, aryl, fluoroaryl or perfluoroaryl, x+y=3 and x=1, 2 or 3.

In embodiments, n is 0.

Also provided is an apparatus adapted to adsorb an adsorbate A from a fluid mixture, said apparatus comprising an adsorbent having the formula $Cu(A)_nZ$, where A is carbonyl or olefin, $n \geq 0$ and Z is a unitary or composite monovalent anion, said adsorbent being adapted to adsorb more than one adsorbate per Cu.

Preferably, the apparatus is a gas adsorption apparatus adapted to adsorb gaseous CO from a gaseous mixture by contacting said gaseous mixture with said adsorbent. More preferably, the adsorbent in said apparatus is adapted to adsorb more than one said CO per Cu in said adsorbent. Even more preferably, the adsorbent is adapted to adsorb at least two or at least three said CO per Cu in said adsorbent.

Prior art apparatuses, such as, e.g., those disclosed in U.S. Pat. Nos. 5,300,271, 5,258,571 and 3,944,440, can be adapted to provide an apparatus of the invention by substituting a composition of the invention for at least a portion of the prior art adsorbent. Of course, the dimensions of an apparatus of the invention can be reduced relative to a conventional apparatus, if desired, due to the increased efficiency of the adsorbent of the invention. An apparatus of the invention can be, e.g., two or three times more efficient than a conventional apparatus of the same dimensions.

Preferably, the adsorbent used in the apparatus of the invention is substantially free of CuCl. Conventional apparatuses employing CuCl-based adsorbents to purify CO from a gas containing CO suffer from problems caused by the reaction of CuCl with water to form HCl, a volatile and corrosive substance.

In embodiments, the apparatus is adapted to adsorb olefins from a fluid mixture containing olefins and hydrocarbons by contacting said fluid mixture with said adsorbent. Preferably, the adsorbent in said apparatus is adapted to adsorb more than one (more preferably at least two) of said olefins per Cu in said adsorbent.

Preferably, Z of said adsorbent is selected from the group consisting of:

a) $X^-$ where $X^-$ is $BF_4^-$, $PF_6^-$ or $SbF_6^-$;

b) $(Al_x(OR)_y)^-$ where R is fluoroalkyl or perfluoroalkyl, and x is 0 and y is 1, or x is 1 and y is 4;

c) $(RCO_2)^-$ where R is alkyl, fluoroalkyl, perfluoroalkyl, aryl, fluoroaryl or perfluoroaryl;

d) $(RSO_3)^-$ where R is alkyl, fluoroalkyl, perfluoroalkyl, aryl, fluoroaryl or perfluoroaryl;

e) $(H(RCO_2)_2)^-$ where R is alkyl, fluoroalkyl, perfluoroalkyl, aryl, fluoroaryl or perfluoroaryl;

f) $(H(RSO_3)_2)^-$ where R is alkyl, fluoroalkyl, perfluoroalkyl, aryl, fluoroaryl or perfluoroaryl;

g) $(N(SO_2R)_x R'_y)^-$ where R is fluoroalkyl, perfluoroalkyl, aryl, fluoroaryl or perfluoroaryl, R' is alkyl, fluoroalkyl, perfluoroalkyl, aryl, fluoroaryl or perfluoroaryl, x+y=2 and x=1 or 2;

h) $(C(SO_2R)_x R'_y)^-$ where R is fluoroalkyl, perfluoroalkyl, aryl, fluoroaryl or perfluoroaryl, R' is hydrogen, alkyl, fluoroalkyl, perfluoroalkyl, aryl, fluoroaryl or perfluoroaryl, x+y=3 and x=1, 2 or 3;

i) $(CB_{11}H_{12-m}X_m)^-$ where m is from 0 to 12, and X is at least one member selected from the group consisting of halogen, alkyl, fluoroalkyl, perfluoroalkyl, aryl, fluoroaryl and perfluoroaryl;

j) $(CB_9H_{10-m}X_m)^-$ where m is from 0 to 10, and X is at least one member selected from the group consisting of halogen, alkyl, fluoroalkyl, perfluoroalkyl, aryl, fluoroaryl and perfluoroaryl; and k) $(CB_{11}F_{11}R)^-$ where R is alkyl, fluoroalkyl, perfluoroalkyl, aryl, fluoroaryl, perfluoroaryl or ammonium.

Preferably, the adsorbent is substantially free of CuCl.

Further provided is a method for adsorbing an adsorbate A from a fluid mixture, said method comprising: providing an adsorption apparatus according to the invention, providing a fluid mixture containing an adsorbate, contacting said fluid mixture with said adsorbent of said apparatus, and adsorbing said adsorbate to said adsorbent, wherein said adsorbent adsorbs in excess of one said adsorbate per Cu in said adsorbent.

Preferably, the method is a gas adsorption process, wherein the apparatus is a gas adsorption apparatus, and said fluid mixture is a gaseous mixture including CO as said adsorbate. Preferably, said adsorbent adsorbs more than one said CO per Cu in said adsorbent. More preferably, said adsorbent adsorbs at least two or at least three said CO per Cu in said adsorbent.

In other embodiments of said method, said fluid mixture contains olefins and hydrocarbons, and said olefins are said adsorbate. Preferably, said adsorbent adsorbs more than one, and more preferably at least two of said olefins per Cu in said adsorbent.

In methods of the invention, Z of said adsorbent is preferably selected from the group consisting of:

a) $X^-$ where $X^-$ is $BF_4^-$, $PF_6^-$ or $SbF_6^-$;

b) $(Al_x(OR)_y)^-$ where R is fluoroalkyl or perfluoroalkyl, and x is 0 and y is 1, or x is 1 and y is 4;

c) $(RCO_2)^-$ where R is alkyl, fluoroalkyl, perfluoroalkyl, aryl, fluoroaryl or perfluoroaryl;

d) $(RSO_3)^-$ where R is alkyl, fluoroalkyl, perfluoroalkyl, aryl, fluoroaryl or perfluoroaryl;

e) $(H(RCO_2)_2)^-$ where R is alkyl, fluoroalkyl, perfluoroalkyl, aryl, fluoroaryl or perfluoroaryl;

f) $(H(RSO_3)_2)^-$ where R is alkyl, fluoroalkyl, perfluoroalkyl, aryl, fluoroaryl or perfluoroaryl;

g) $(N(SO_2R)_x R'_y)^-$ where R is fluoroalkyl, perfluoroalkyl, aryl, fluoroaryl or perfluoroaryl, R' is alkyl, fluoroalkyl, perfluoroalkyl, aryl, fluoroaryl or perfluoroaryl, x+y=2 and x=1 or 2;

h) $(C(SO_2R)_x R'_y)^-$ where R is fluoroalkyl, perfluoroalkyl, aryl, fluoroaryl or perfluoroaryl, R' is hydrogen, alkyl, fluoroalkyl, perfluoroalkyl, aryl, fluoroaryl or perfluoroaryl, x+y=3 and x=1, 2 or 3;

i) $(CB_{11}H_{12-m}X_m)^-$ where m is from 0 to 12, and X is at least one member selected from the group consisting of halogen, alkyl, fluoroalkyl, perfluoroalkyl, aryl, fluoroaryl and perfluoroaryl;

j) $(CB_9H_{10-m}X_m)^-$ where m is from 0 to 10, and X is at least one member selected from the group consisting of halogen, alkyl, fluoroalkyl, perfluoroalkyl, aryl, fluoroaryl and perfluoroaryl; and k) $(CB_{11}F_{11}R)^-$ where R is alkyl, fluoroalkyl, perfluoroalkyl, aryl, fluoroaryl, perfluoroaryl or ammonium.

Preferably, said adsorbent is substantially free of CuCl.

The invention will be illustrated in more detail with reference to the following Examples, but it should be understood that the present invention is not deemed to be limited thereto.

Copper(I) compounds can be oxygen-sensitive and moisture-sensitive. Therefore, preparations and physical measurements are preferably carried out with rigorous exclusion of air and water. Reagents and solvents are preferably reagent grade or better. Solvents are preferably dried by distillation from sodium metal, $P_2O_5$, $CaH_2$, and/or activated 4 Å molecular sieves.

In general, IR and NMR spectra of samples were recorded using instruments and sampling techniques described in Hurlburt et al., 116 J. Am. Chem. Soc. 10003 (1994). An exception of note is a new technique developed for investigating the ν(CO) region of IR spectra of solid copper (I) carbonyls in the presence of gaseous CO. See Rack et al., 52 Applied Spectroscopy 1035 (1998). Since ν(CO) for gaseous CO is 2143 $cm^{-1}$ and ν(CO) values for copper(I) carbonyls typically range from 2100 to 2200 $cm^{-1}$, a cell was designed that allows the IR beam to pass through a solid sample in contact with a gas but prevents the IR beam from passing through the gaseous CO.

The cell allows a Nujol or Fluorolube mull of the solid sample to be suspended between a pair of 3-mm thick sapphire windows held ~0.1 mm apart within the body of a high-pressure cell machined from Vascomax C300 maraging steel. In a typical experiment, a sample was prepared and placed between the windows of the cell in an inert-atmosphere glovebox. The gas-tight cell was removed from the glovebox, attached to a carbon monoxide gas manifold, and the requisite pressure of CO was added. Gaseous CO then diffused through the mulling agent and interacted with the suspended solid particles. However, since the IR beam only passed through the two windows and the 0.1-mm thick mull, the beam did not pass through any gas and therefore the spectrum did not include the 2143 $cm^{-1}$ band of gaseous CO.

An important variation of the new technique is to use the high-gas-pressure cell for "mull-less" samples. In this variation, a solution of the compound of interest is slowly dripped onto the inside surface of one or both of the sapphire windows in an inert atmosphere glovebox. The windows are placed horizontally throughout this procedure, allowing the solvent to continually evaporate as a uniform film of microcrystalline compound forms on the inside surface of the windows. When the cell is assembled and gaseous CO is added, ν(CO) bands of the mull-less sample cannot be observed without interference from the intense ν(CO)

absorptions of the high pressure gas (as described above). However, other regions of the IR spectrum can be observed. The advantage of this technique is that the true time course of CO uptake by a sample can be measured, assuming that a band or bands in the IR spectrum other than $\nu(CO)$ bands change position or intensity as CO is taken up by the sample.

The experimental procedures used to obtain X-ray crystallographic data were similar to those described in Strauss, "Nonclassical Metal Carbonyls," 10 Chemtracts-Inorganic Chemistry 77 (1997) and the references cited therein.

EXAMPLE 1

Preparation of Polycarbonyl of $(Cu)(12-CB_{11}H_{11}F)$ $(Ag)(CB_{11}H_{11}F)$ (0.0799 g, 0.297 mmol) is dissolved in 5 mL benzene resulting in a clear golden brown solution. A suspension of CuCl (0.0299 g, 0.302 mmol) is then prepared in 5 mL benzene. These two mixtures are combined, and then stirred for 4 hours at room temperature, stirred for 3 hours at 40° C., and stirred for 30 minutes at reflux. After this time, the mixture is filtered to provide a white solid and a clear, golden brown filtrate. Benzene is removed from the latter under vacuum to yield $(Cu)(12-CB_{11}H_{11}F)$ in the form of a light brown solid.

The $(Cu)(12-CB_{11}H_{11}F)$ is treated with 500 psi CO in a high-pressure cell (sapphire windows) for 15 hours. Infrared spectroscopy confirms that the $(Cu)(12-CB_{11}H_{11}F)$ adsorbs more than one equivalent of CO per equivalent of copper(I) to provide $(Cu(CO)_2)(12-CB_{11}H_{11}F)$. The frequencies at which maximum carbonyl absorption occur ($\nu(CO)$) in a Nujol mull, are 2183 and 2160 $cm^{-1}$. Monocarbonyl has $\nu(CO)$s of 2162 and 2167 $cm^{-1}$.

EXAMPLE 2

Preparation of Polycarbonyl of $(Cu)(12-CB_{11}H_{11}F)/SiO_2$ $(Cu)(12-CB_{11}H_{11}F)$ (0.126 g, 0.56 mmol) is dissolved in 15 mL $CH_2Cl_2$ and $SiO_2$ (0.785 g, 13.1 mmol) is added to make a suspension. This is stirred for 17.5 hours, after which time the mixture is filtered to provide $(Cu)(12-CB_{11}H_{11}F)/SiO_2$ in the form of an off-white solid.

The $(Cu)(12-CB_{11}H_{11}F)$ is treated with 100 psi CO in a high-pressure cell (sapphire windows) for 1.5 hours. Infrared spectroscopy confirms that the $(Cu)(12-CB_{11}H_{11}F)$ adsorbs more than one equivalent of CO per equivalent of copper(I) to provide $(Cu(CO)_2)(12-CB_{11}H_{11}F)$ having a $\nu(CO)$ of 2184 $cm^{-1}$. The monocarbonyl peak cannot be distinguished.

EXAMPLE 3

Preparation of Polycarbonyl of $(Cu)(CF_3SO_3)$ $Cu(C_6H_6)(CF_3SO_3)$ is heated under vacuum at 80–90° C. for 12 hours. The residue is recrystallized from ethyl ether to provide $(Cu)(CF_3SO_3)$.

$(Cu)(CF_3SO_3)$ is treated with 2000 psi CO in a high-pressure cell (sapphire windows) for 12 hours to provide $(Cu(CO)_2)(CF_3SO_3)$ having $\nu(CO)$s of 2143 and 2171 $cm^{-1}$ in Fluorolube. The monocarbonyl has a $\nu(CO)$ of 2143 $cm^{-1}$.

EXAMPLE 4

Preparation of Polycarbonyl of $(Cu)(OC(CF_3)_3)$ $(Cu)(OC(CF_3)_3)$ (i.e., (Cu)(PFTB)) is disclosed by Purdy et al. in 30 Inorg. Chem. 1969 (1991), and can be prepared by treating mesitylcopper (I) (Cu(Mes)) with the commercially available alcohol H(PFTB). In a typical preparation, Cu(Mes) (0.438 g, 2.40 mmol) is mixed with H(PFTB) (0.638 g, 2.70 mmol) in hexane for 22 hours at room temperature. Some green solids are filtered away from a pale orange filtrate. Volatiles are removed from the filtrate, leaving a dark orange viscous liquid. This is heated to 50° C. under vacuum, and (Cu)(PFTB) in the form of a yellow-orange solid is collected on a cold finger.

(Cu)(PFTB) is treated with 830 psi CO in a high-pressure cell (sapphire windows) for 3 hours to provide $(Cu(CO)_2)(OC(CF_3)_3)$ having $\nu(CO)$s of 2132 and 2156 $cm^{-1}$. The monocarbonyl peak cannot be distinguished, but is known to be at 2131 $cm^-$.

EXAMPLE 5

Preparation of Polycarbonyl of $(Cu)(OC(CH_3)(CF_3)_2)$ $(Cu)(OC(CH_3)(CF_3)_2)$ (i.e., (Cu)(HFTB)) is prepared by dissolving 2.8 g (15.38 mmol) H(HFTB) in 6 mL hexane and adding the resulting solution to a 10 mL suspension of 0.95 g (5.21 mmol) of mesitylcopper(I) (Cu(Mes)) in hexane. After mixing, a brown suspension results, which is stirred for 21 hours. The resulting brown suspension is filtered to leave a brown solid and a pale orange filtrate. Hexane and mesitylene are removed from the filtrate under vacuum to yield (Cu)(HFTB) as an orange solid (0.84 g, 66%).

The (Cu)(HFTB) is treated with 1660 psi CO in a high pressure cell (sapphire windows) for 88 hours to provide $(Cu(CO)_2)(HFTB)$ having $\nu(CO)$s in Fluorolube of 2120 and 2155 $cm^-$. The monocarbonyl peak cannot be distinguished.

EXAMPLE 6

Preparation of Polycarbonyl of $(Cu)(Al(HFTB)_4)$ $(Cu)(Al(HFTB)_4)$ is prepared by dissolving 0.0607 g (0.061 mmol) $((C_6H_5)_3C)(Al(HFTB)_4)$ in 8 mL $CH_2Cl_2$ to form a yellow solution which is then added to a yellow solution (8 mL) of 0.0111 g (0.061 mmol) (Cu(Mes)). Upon mixing, the solution turns an orange-yellow color. It is left overnight without stirring, after which time $CH_2Cl_2$ is removed under vacuum to provide $(Cu)(Al(HFTB)_4)$ as a red-brown solid.

The $(Cu)(Al(HFTB)_4)$ is treated with 1.3 atm CO in a Brass cell (ZnSe windows) for 1.25 hours, then placed under dynamic vacuum for 5 minutes to provide $(Cu(CO)_2)(Al(HFTB)_4)$ having $\nu(CO)$s in Fluorolube of 2153 $cm^-$ and 2179 $cm^-$. The monocarbonyl peak cannot be distinguished.

EXAMPLE 7

Preparation of Polycarbonyl of $(N(n-Bu)_4)(CuCB_{11}F_{11})$ $(N(n-Bu)_4)(CuCB_{11}F_{11})$ is prepared by dissolving (tetrabutylammonium)$(CB_{11}F_{11}H)$ in $CH_2Cl_2$. This solution is added to a yellow solution of (Cu(Mes)) in $CH_2Cl_2$. The reaction mixture is yellow with a total volume of 2 mL. Solid $(N(n-Bu)_4)(CuCB_{11}F_{11})$ is obtained from the reaction mixture by filtration.

The $(N(n-Bu)_4)(CuCB_{11}F_{11})$ is treated with 500 psi CO in a high-pressure cell (sapphire windows) for 188 hours at a temperature between 60–70° C., to provide $(N(n-Bu)_4)(Cu(CO)_2CB_{11}F_{11})$ having $\nu(CO)$s in Fluorolube of 2148 $cm^{-1}$ and 2171 $cm^-$. The $\nu(CO)$ for the monocarbonyl is 2126 $cm^-$.

EXAMPLE 8

Preparation of Polycarbonyl of $(Cu(CO)_2)(H(CF_3CO_2)_2)_2$ $(Cu(CO)_2)(H(CF_3CO_2)_2)_2$ is prepared by dissolving $CuCF_3CO_2$ (0.0055 g, 0.0312 mmol) and $CF_3CO_2H$ (20 drops, 0.21 mmol) in 3 mL $C_6H_6$. The $(Cu)(H(CF_3CO_2)_2)$ is treated with 1.3 atm CO in a Teflon cell to provide $(Cu(CO)_2)(H(CF_3CO_2)_2)_2$ having $\nu(CO)$s of 2134 and 2167 $cm^-$. The monocarbonyl peak cannot be distinguished.

EXAMPLE 9

Preparation of Polycarbonyls of $(Cu)(N(SO_2CF_3)_2)$ $(Cu)(N(SO_2CF_3)_2)$ is prepared by dissolving $NH(SO_2CF_3)_2$ (0.605 mg, 0.215 mmol) in 4 mL $CH_2Cl_2$ and adding the resulting solution to a yellow solution (4 mL) of (Cu(Mes)) (0.444 mg, 0.234 mmol). The resulting mixture is pink. After stirring overnight, $CH_2Cl_2$ and mesitylene are removed under vacuum to leave $(Cu)(N(SO_2CF_3)_2)$ as a pink-brown solid.

An X-ray analysis and a gas adsorption isotherm analysis show that $(Cu)(N(SO_2CF_3)_2)$ adsorbs more than one equivalent of CO per equivalent of copper (I). $(Cu)(N(SO_2CF_3))$ is dissolved in benzene, placed in a Teflon cell and treated with 1.3 atm CO for 20 minutes to provide $(Cu(CO)_2)(N(SO_2CF_3)_2)$ having $\nu(CO)$s of 2147 cm$^-$ and 2173 cm$^-$. The monocarbonyl peak cannot be distinguished.

Crystals of the dicarbonyl composition exhibit an X-ray diffraction pattern which distinguishes the composition from other prior crystalline compositions. The X-ray diffraction pattern of this composition may have the following characteristic values:

Radiation used = x-ray
Wavelength = 1.54178 Å
I/Io relative intensity scale:

| weak (w) = 0–25 | strong (s) = 50–75 |
| --- | --- |
| medium (m) = 25–50 | very strong (vs) = 75–100 |

| d-spacing (Å) | relative intensity |
| --- | --- |
| 8.6 ± 0.2 | vs |
| 6.85 ± 0.2 | m |
| 5.68 ± 0.1 | vs |
| 4.52 ± 0.1 | s |
| 4.13 ± 0.1 | s/vs |
| 4.02 ± 0.1 | s |

More preferably, the X-ray diffraction pattern of this composition may have the following characteristic values:

| d-spacing (Å) | relative intensity |
| --- | --- |
| 9.47 ± 0.2 | w |
| 8.6 ± 0.2 | vs |
| 6.85 ± 0.2 | m |
| 5.68 ± 0.1 | vs |
| 5.35 ± 0.1 | w |
| 5.11 ± 0.1 | m |
| 4.52 ± 0.1 | s |
| 4.3 ± 0.1 | w |
| 4.13 ± 0.1 | s/vs |
| 4.02 ± 0.1 | s |
| 3.9 ± 0.1 | w |
| 3.72 ± 0.1 | w |
| 3.5 ± 0.1 | w |
| 3.43 ± 0.1 | w |
| 3.35 ± 0.1 | s/vs |
| 3.29 ± 0.1 | w |
| 3.2 ± 0.1 | w/m |
| 3.16 ± 0.1 | m/s |
| 3.01 ± 0.1 | w |
| 3.00 ± 0.1 | w |
| 2.98 ± 0.05 | w |
| 2.97 ± 0.05 | w |
| 2.94 ± 0.05 | w/m |
| 2.91 ± 0.05 | w |
| 2.87 ± 0.05 | w |
| 2.8 ± 0.05 | w |
| 2.76 ± 0.05 | w |

-continued

| d-spacing (Å) | relative intensity |
| --- | --- |
| 2.69 ± 0.05 | w |
| 2.67 ± 0.05 | w |
| 2.64 ± 0.05 | m |
| 2.59 ± 0.05 | w |
| 2.57 ± 0.05 | w |
| 2.56 ± 0.05 | w |
| 2.54 ± 0.05 | w/m |

$(Cu(CO)_3)(N(SO_2CF_3)_2)$ is synthesized by treating $(Cu)(N(SO_2CF_3)_2)$ with 2000 psi CO in a high-pressure cell (sapphire windows) for 165 hours. The tricarbonyl has $\nu(CO)$s in Fluorolube of 2172 cm$^-$ and 2191 cm$^-$.

EXAMPLE 10

Preparation of Polycarbonyls of $(Cu)(1\text{-}(CH_2CH_3)\text{-}CB_{11}F_{11})$ A solution of $(Cu)(1\text{-}(CH_2CH_3)\text{-}CB_{11}F_{11})$ in $CH_2Cl_2$ is placed in a Teflon cell and treated with 1 atm CO. After 2 hours, a vacuum is applied for 10 seconds to provide $(Cu(CO)_2)(1\text{-}(CH_2CH_3)\text{-}CB_{11}F_{11})$ having $\nu(CO)$s of 2187 and 2173 cm$^{-1}$. The $\nu(CO)$ for the monocarbonyl is 2178 cm$^-$.

A solution of $(Cu)(1\text{-}(CH_2CH_3)\text{-}CB_{11}F_{11})$ in $CH_2Cl_2$ is placed in a Teflon cell and treated with 1 atm CO to provide $(Cu(CO)_3)(1\text{-}(CH_2CH_3)\text{-}CB_{11}F_{11})$ having $\nu(CO)$s of 2189 cm$^{-1}$ and 2168 cm$^{-1}$.

$(Cu(CO)_4)(1\text{-}(CH_2CH_3)\text{-}CB_{11}F_{11})$ in the solid state is synthesized as follows. $CH_2Cl_2$ is filtered from a solution of $(Cu)(1\text{-}(CH_2CH_3)\text{-}CB_{11}F_{11})$ to leave a yellow powder. This is treated with 355 psi CO in a high-pressure cell for 98 hours to provide the tetracarbonyl having $\nu(CO)$ in Fluorolube of 2184 cm$^{-1}$. The $\nu(CO)$ for the monocarbonyl is 2175 cm$^{-1}$.

Crystals of the tetracarbonyl composition exhibit an X-ray diffraction pattern which distinguishes the composition from other prior crystalline compositions. The X-ray diffraction pattern of this composition may have the following characteristic values:

Radiation used = x-ray
Wavelength = 1.54178 Å
I/Io relative intensity scale:

| weak (w) = 0–25 | strong (s) = 50–75 |
| --- | --- |
| medium (m) = 25–50 | very strong (vs) = 75–100 |

| d-spacing (Å) | relative intensity |
| --- | --- |
| 8.46 ± 0.2 | s |
| 7.14 ± 0.2 | vs |
| 6.16 ± 0.2 | vs |
| 5.65 ± 0.1 | vs |
| 5.33 ± 0.1 | vs |

More preferably, the X-ray diffraction pattern of this composition may have the following characteristic values:

| d-spacing (Å) | relative intensity |
| --- | --- |
| 9.62 ± 0.2 | w |
| 8.46 ± 0.2 | s |
| 8.33 ± 0.2 | w |

-continued

| d-spacing (Å) | relative intensity |
|---|---|
| 7.14 ± 0.2 | vs |
| 6.94 ± 0.2 | m |
| 6.67 ± 0.2 | m |
| 6.16 ± 0.2 | vs |
| 6.01 ± 0.2 | w/m |
| 5.82 ± 0.1 | w |
| 5.65 ± 0.1 | vs |
| 5.33 ± 0.1 | vs |
| 5.24 ± 0.1 | w |
| 4.98 ± 0.1 | w |
| 4.95 ± 0.1 | w |
| 4.81 ± 0.1 | w |
| 4.66 ± 0.1 | w |
| 4.38 ± 0.1 | w |
| 4.37 ± 0.1 | w |
| 4.23 ± 0.1 | w |
| 4.16 ± 0.1 | w |
| 4.1 ± 0.1 | w |
| 4.05 ± 0.1 | w |
| 4.03 ± 0.1 | w |
| 3.99 ± 0.1 | w |
| 3.94 ± 0.1 | w |
| 3.8 ± 0.1 | w |
| 3.74 ± 0.1 | w |
| 3.58 ± 0.1 | w |
| 3.53 ± 0.1 | w |

EXAMPLE 11

Preparation of Polycarbonyl of $Cu(C_6H_5CH_2)CB_{11}F_{11}$

A solution of 2.5 M n-BuLi in hexane (0.75 mL) is added to a solution of $[Me_3NH][1\text{-}H\text{-}CB_{11}F_{11}]$ (0.376 g) in 25 mL of THF. The resulting reaction mixture is stirred at room temperature for 1 h and then placed under vacuum for 10 min in order to remove trimethylamine. The solution is treated with 0.2 mL of $C_6H_5CH_2Br$ and stirred overnight. THF and $NMe_3$ are removed using a rotary evaporator and 15 mL of distilled water is added. The resulting solution is filtered to remove solids. A solution of CsCl (0.16 g) in distilled water is added to the filtrate. The white precipitate is collected by filtration, washed with 5 mL of distilled water and dried under vacuum to yield 0.328 g (62%) of $Cs(C_6H_5CH_2)(CB_{11}F_{11})$.

A solution of $Cs(C_6H_5CH_2)(CB_{11}F_{11})$ (0.33 g B 0.59 mmol) and $AgNO_3$ (0.30 g–1.76 mmol) in 50 mL of benzene is stirred at 65° C. for 20 h. The solution is cooled to 40° C. and filtered. Benzene is removed under vacuum to provide a white solid. The solid is dried under vacuum overnight, then is dissolved in 20 ml of $CH_2Cl_2$ and filtered to provide 0.37 mmol of $(Ag(C_6H_6))(C_6H_5CH_2)(CB_{11}F_{11})$. Yield is 63%.

A solution of $(Ag(C_6H_6))(C_6H_5CH_2)(CB_{11}F_{11})$ (0.15 g–0.24 mmol) and CuCl (0.10 g–1.01 mmol) in 30 mL of $CH_2Cl_2$ is stirred at room temperature under 1.3 atm of CO for 2 weeks. Then the atmosphere of CO is changed with $N_2$. The solution is filtered in a glovebox. The resulting filtrate is placed under vacuum to remove $CH_2Cl_2$. A pale yellow solid is formed. The solid is dried under vacuum for 4 h. Yield is 0.16 mmol of $(Cu(C_6H_6)_{1/2})(C_6H_5CH_2)(CB_{11}F_{11})$ (67%).

$(Cu(CO)_2)(C_6H_5CH_2)(CB_{11}F_{11})$ in the solid state is synthesized by treatment with CO in a high-pressure cell for an extended period. The composition is a crystalline material which exhibits an X-ray diffraction pattern which distinguishes it from other prior crystalline compositions. The X-ray diffraction pattern of this composition may have the following characteristic values:

Radiation used = x-ray
Wavelength = 1.54178 Å
I/Io relative intensity scale:

| weak (w) = 0–25 | strong (s) = 50–75 |
|---|---|
| medium (m) = 25–50 | very strong (vs) = 75–100 |

| d-spacing (Å) | relative intensity |
|---|---|
| 6.87 ± 0.2 | w/m |
| 6.57 ± 0.2 | vs |
| 6.1 ± 0.2 | m |
| 5.76 ± 0.1 | s |
| 5.32 ± 0.1 | m |

More preferably, the X-ray diffraction pattern of this composition may have the following characteristic values:

| d-spacing (Å) | relative intensity |
|---|---|
| 10.2 ± 0.2 | w |
| 6.87 ± 0.2 | w/m |
| 6.57 ± 0.2 | vs |
| 6.1 ± 0.2 | m |
| 6.08 ± 0.2 | w |
| 5.76 ± 0.1 | s |
| 5.48 ± 0.1 | w |
| 5.32 ± 0.1 | m |
| 5.09 ± 0.1 | w |
| 4.78 ± 0.1 | w |
| 4.72 ± 0.1 | w |
| 4.66 ± 0.1 | m |
| 4.48 ± 0.1 | w |
| 4.25 ± 0.1 | w |
| 4.23 ± 0.1 | w |
| 4.12 ± 0.1 | w |
| 4.03 ± 0.1 | w |
| 3.85 ± 0.1 | w |
| 3.74 ± 0.1 | w |
| 3.67 ± 0.1 | w |

COMPARATIVE EXAMPLE

Preparation of monocarbonyl of $(Cu)(CF_3SO_3)/SiO_2$ $SiO_2$ is added to a solution of $(Cu)(CF_3SO_3)$ in ether, and the suspension is stirred for 3 hours. After this time, the mixture is filtered to provide $(Cu)(CF_3SO_3)/SiO_2$ as a green powder, which is dried under vacuum.

The $(Cu)(CF_3SO_3)/SiO_2$ is treated with CO to provide $((Cu(CO))(CF_3SO_3)/SiO_2)$ having a v(CO) of 2136 $cm^-$.

While the invention has been described in detail and with reference to specific examples thereof, it will be apparent to one skilled in the art that various changes and modifications can be made therein without departing from the spirit and scope thereof.

What is claimed is:

1. A solid state composition having the formula $Cu(A)_n Z$, where A is carbonyl or an olefin, n>1 and Z is a unitary or composite monovalent anion other than $(AsF_6)^-$, (alkyl-$CB_{11}F_{11})^-$ or zeolite supported on a substrate.

2. The composition of claim 1, wherein Z comprises an organic group or a halide.

3. The composition of claim 1, wherein Z is a composite anion comprising a plurality of anionic fragments bonded to a cation with a positive charge one unit less than a sum of negative charges of said anionic fragments.

4. The composition of claim 1, wherein Z is selected from the group consisting of:

a) is $BF_4^-, PF_6^-$ or $SbF_6^-$;

b) $(Al_x(OR)_y)^-$ where R is fluoroalkyl or perfluoroalkyl, and x is 0 and y is 1, or x is 1 and y is 4;

c) $(RCO_2)^-$ where R is alkyl, fluoroalkyl, perfluoroalkyl, aryl, fluoroaryl or perfluoroaryl;

d) $(RSO_3)^-$ where R is alkyl, fluoroalkyl, perfluoroalkyl, aryl, fluoroaryl or perfluoroaryl;

e) $(H(RCO_2)_2)^-$ where R is alkyl, fluoroalkyl, perfluoroalkyl, aryl, fluoroaryl or perfluoroaryl;

f) $(H(RSO_3)_2)^-$ where R is alkyl, fluoroalkyl, perfluoroalkyl, aryl, fluoroaryl or perfluoroaryl;

g) $(N(SO_2R)_x R'_y)^-$ where R is fluoroalkyl, perfluoroalkyl, aryl, fluoroaryl or perfluoroaryl, R' is alkyl, fluoroalkyl, perfluoroalkyl, aryl, fluoroaryl or perfluoroaryl, x+y=2 and x=1 or 2;

h) $(C(SO_2R)_x R'_y)^-$ where R is fluoroalkyl, perfluoroalkyl, aryl, fluoroaryl or perfluoroaryl, R' is hydrogen, alkyl, fluoroalkyl, perfluoroalkyl, aryl, fluoroaryl or perfluoroaryl, x+y=3 and x=1, 2 or 3;

i) $(CB_{11}H_{12-m}X_m)^-$ where m is from 0 to 12, and X is at least one member selected from the group consisting of halogen, alkyl, fluoroalkyl, perfluoroalkyl, aryl, fluoroaryl and perfluoroaryl;

j) $(CB_9H_{10-m}X_m)^-$ where m is from 0 to 10, and X is at least one member selected from the group consisting of halogen, alkyl, fluoroalkyl, perfluoroalkyl, aryl, fluoroaryl and perfluoroaryl; and k) $(CB_{11}F_{11}R)^-$ where R is alkyl, fluoroalkyl, perfluoroalkyl, aryl, fluoroaryl, perfluoroaryl or ammonium.

5. The composition of claim 1, wherein said substrate is a zeolite.

6. The composition of claim 1, wherein A is carbonyl.

7. The composition of claim 4, wherein Z is $(CB_{11}H_{12-m}X_m)^-$, where $CB_{11}H_{12-m}$ is 1-carba-closo-dodecaborate, and X is chlorine, bromine, iodine or fluorine.

8. The composition of claim 4, wherein Z is $(CB_9H_{10-m}X_m)^-$, where $CB_9H_{10-m}$ is 1-carba-closo-decaborate, and X is chlorine, bromine, iodine or fluorine.

9. The composition of claim 1, wherein Z is $(1-R-CB_{11}H_{12-m}X_m)^-$, where $CB_{11}H_{12-m}$ is 1-carba-closo-dodecaborate, R is alkyl, fluoroalkyl, perfluoroalkyl, aryl, fluoroaryl or perfluoroaryl, and X is chlorine, bromine, iodine or fluorine.

10. An apparatus adapted to adsorb an adsorbate A from a fluid mixture, said apparatus comprising an adsorbent containing a composition according to claim 1.

11. A method for adsorbing an adsorbate A from a fluid mixture, said method comprising:

providing an adsorption apparatus according to claim 10;

providing a fluid mixture containing said adsorbate;

contacting said fluid mixture with said adsorbent of said apparatus; and adsorbing said adsorbate to said adsorbent, wherein said adsorbent adsorbs in excess of one said adsorbate per Cu in said adsorbent.

12. The apparatus of claim 10, wherein a crystalline form of said adsorbent has by a x-ray diffraction pattern having the following characteristic d-spacing values in Angstroms: 6.87±0.2, 6.57±0.2, 6.1±0.2, 5.76±0.1, and 5.32±0.1.

13. The apparatus of claim 10, wherein a crystalline form of said adsorbent has by a x-ray diffraction pattern having the following characteristic d-spacing values in Angstroms: 10.2±0.2, 6.87±0.2, 6.57±0.2, 6.1±0.2, 6.08±0.2, 5.76±0.1, 5.48±0.1, 5.32±0.1, 5.09±0.1, 4.78±0.1, 4.72±0.1, 4.66±0.1, 4.48±0.1, 4.25±0.1, 4.2±0.1, 4.1±0.1, 4.03±0.1, 3.85±0.1, 3.74±0.1, and 3.67±0.1.

14. The composition of claim 1, wherein a crystalline form of said composition has by a x-ray diffraction pattern having the following characteristic d-spacing values in Angstroms: 8.6 " 0.2, 6.85 " 0.2, 5.68 " 0.1, 4.52 " 0.1, 4.13 " 0.1 and 4.02 " 0.1.

15. The composition of claim 1, wherein a crystalline form of said composition has by a x-ray diffraction pattern having the following characteristic d-spacing values in Angstroms: 9.47±0.2, 8.6±0.2, 6.85±0.2, 5.68±0.1, 5.35±0.1, 5.11±0.1, 4.52±0.1, 4.3±0.1, 4.13±0.1, 4.02±0.1, 3.9±0.1, 3.72±0.1, 3.5±0.1, 3.43±0.1, 3.35±0.1, 3.29±1,0. 132±0.1, 3.16±0.1, 3.01±0.1, 3.00±0.1, 2.98±0.05, 2.97±0.05, 2.94±0.05, 2.91±0.05, 2.87±0.05, 2.8±0.05, 2.76±0.05, 2.69±0.05, 2.67±0.05, 2.64±0.05, 2.59±0.05, 2.57±0.05, 2.56±0.05, and 2.54±0.05.

16. The composition of claim 1, wherein a crystalline form of said composition by a x-ray diffraction pattern having the following characteristic d-spacing values in Angstroms: 8.46±0.2, 7.14±0.2, 6.16±0.2, 5.65±0.1, and 5.33±0.1.

17. The composition of claim 1, wherein a crystalline form of said composition has by a x-ray diffraction pattern having the following characteristic d-spacing values in Angstroms: 9.62±0.2, 8.46±0.2, 8.33±0.2, 7.14±0.2, 6.94±0.2, 6.67±0.2, 6.16±0.2, 6.01±0.2, 5.82±0.1, 5.65±0.1, 5.33±0.1, 5.24±0.1, 4.98±0.1, 4.95±0.1, 4.81±0.1, 4.66±0.1, 4.38±0.1, 4.37±0.1, 4.23±0.1, 4.16±0.1, 4.1±0.1, 4.05±0.1, 4.03±0.1, 3.99±0.1, 3.94±0.1, 3.8±0.1, 3.74±0.1, 3.58±0.1, and 3.53±0.1.

18. A solid state composition supported on a substrate having the formula $Cu(A)_n Z$, where A is carbonyl or an olefin, $n \geq 0$ and Z is selected from the group consisting of:

a) $X^-$, where X is $BF_4^-$, $PF_6^-$ or $SbF_6^-$;

b) $(RCO_2)^-$, where R is alkyl, aryl or fluoroaryl;

c) $(H(RCO_2)_2)^-$ where R is alkyl, fluoroalkyl, perfluoroalkyl, aryl, fluoroaryl or perfluoroaryl;

d) $(H(RSO_3)_2)^-$ where R is alkyl, fluoroalkyl, perfluoroalkyl, aryl, fluoroaryl or perfluoroaryl;

e) $(N(SO_2R)_x R'_y)^-$ where R is fluoroalkyl, perfluoroalkyl, aryl, fluoroaryl or perfluoroaryl, R' is alkyl, fluoroalkyl, perfluoroalkyl, aryl, fluoroaryl or perfluoroaryl, x+y=2 and x=1 or 2; and f) $(C(SO_2R)_x R'_y)^-$ where R is fluoroalkyl, perfluoroalkyl, aryl, fluoroaryl or perfluoroaryl, R' is hydrogen, alkyl, fluoroalkyl, perfluoroalkyl, aryl, fluoroaryl or perfluoroaryl, x+y=3 and x=1, 2 or 3.

19. The composition of claim 18, wherein n is 0.

20. The composition of claim 11, wherein said substrate is a zeolite.

21. The composition of claim 8, wherein A is carbonyl.

22. An apparatus adapted to adsorb an adsorbate A from a fluid mixture, said apparatus comprising an adsorbent having the formula $Cu(A)_n Z$, where A is a carbonyl or olefin, $n \geq 0$ and Z is a unitary or composite monovalent anion support on a substrate, said adsorbent being adapted to adsorb more than one said adsorbate A per Cu.

23. The apparatus of claim 22, wherein said apparatus is a gas adsorption apparatus adapted to adsorb gaseous CO from a gaseous mixture by contacting said gaseous mixture with said adsorbent.

24. The apparatus of claim 23, wherein said adsorbent is adapted to adsorb at least two said CO per Cu in said adsorbent.

25. The apparatus of claim 23, wherein said adsorbent is adapted to adsorb at least three said CO per Cu in said adsorbent.

26. The apparatus of claim 22, wherein said apparatus is adapted to adsorb olefins from a fluid mixture containing olefins and hydrocarbons by contacting said fluid mixture with said adsorbent.

27. The apparatus of claim 22, wherein Z of said adsorbent is selected from the group consisting of:

a) $BF_4^-, PF_6^-$ or $SbF_6^-$;

b) $(Al_x(OR)_y)^-$ where R is fluoroalkyl or perfluoroalkyl, and x is 0 and y is 1, or x is 1 and y is 4;

c) $(RCO_2)^-$ where R is alkyl, fluoroalkyl, perfluoroalkyl, aryl, fluoroaryl or perfluoroaryl;

d) $(RSO_3)^-$ where R is alkyl, fluoroalkyl, perfluoroalkyl, aryl, fluoroaryl or perfluoroaryl;

e) $(H(RCO_2)_2)^-$ where R is alkyl, fluoroalkyl, perfluoroalkyl, aryl, fluoroaryl or perfluoroaryl;

f) $(H(RSO_3)_2)^-$ where R is alkyl, fluoroalkyl, perfluoroalkyl, aryl, fluoroaryl or perfluoroaryl;

g) $(N(SO_2R)_x R'_y)^-$ where R is fluoroalkyl, perfluoroalkyl, aryl, fluoroaryl or perfluoroaryl, R' is alkyl, fluoroalkyl, perfluoroalkyl, aryl, fluoroaryl or perfluoroaryl, x+y=2 and x=1 or 2;

h) $(C(SO_2R)_x R'_y)^-$ where R is fluoroalkyl, perfluoroalkyl, aryl, fluoroaryl or perfluoroaryl, R' is hydrogen, alkyl, fluoroalkyl, perfluoroalkyl, aryl, fluoroaryl or perfluoroaryl, x+y=3 and x=1, 2 or 3;

i) $(CB_{11}H_{12-m}X_m)^-$ where m is from 0 to 12, and X is at least one member selected from the group consisting of halogen, alkyl, fluoroalkyl, perfluoroalkyl, aryl, fluoroaryl and perfluoroaryl;

j) $(CB_9H_{10-m}X_m)^-$ where m is from 0 to 10, and X is at least one member selected from the group consisting of halogen, alkyl, fluoroalkyl, perfluoroalkyl, aryl, fluoroaryl and perfluoroaryl; and k) $(CB_{11}F_{11}R)^-$ where R is alkyl, fluoroalkyl, perfluoroalkyl, aryl, fluoroaryl, perfluoroaryl or ammonium.

28. The apparatus of claim 22, wherein said adsorbent is free of CuCl.

29. A method for adsorbing an adsorbate A from a fluid mixture, said method comprising:

providing an adsorption apparatus according to claim 22;

providing a fluid mixture containing said adsorbate;

contacting said fluid mixture with said adsorbent of said apparatus; and adsorbing said adsorbate to said adsorbent, wherein said adsorbent adsorbs in excess of one said adsorbate per Cu in said adsorbent.

30. The method of claim 29, wherein said apparatus is a gas adsorption apparatus, and said fluid mixture is a gaseous mixture including CO as said adsorbate.

31. The method of claim 30, wherein said adsorbent adsorbs at least two said CO per Cu in said adsorbent.

32. The method of claim 30, wherein said adsorbent adsorbs at least three said CO per Cu in said adsorbent.

33. The method of claim 29, wherein said fluid mixture contains olefins and hydrocarbons, and said olefins are said adsorbate.

34. The method of claim 29, wherein Z of said adsorbent is selected from the group consisting of:

a) X where X is $BF_4^-, PF_6^-$ or $SbF_6^-$;

b) $(Al_x(OR)_y)^-$ where R is fluoroalkyl or perfluoroalkyl, and x is 0 and y is 1, or x is 1 and y is 4;

c) $(RCO_2)^-$ where R is alkyl, fluoroalkyl, perfluoroalkyl, aryl, fluoroaryl or perfluoroaryl;

d) $(RSO_3)^-$ where R is alkyl, fluoroalkyl, perfluoroalkyl, aryl, fluoroaryl or perfluoroaryl;

e) $(H(RCO_2)_2)^-$ where R is alkyl, fluoroalkyl, perfluoroalkyl, aryl, fluoroaryl or perfluoroaryl;

f) $(H(RSO_3)_2)^-$ where R is alkyl, fluoroalkyl, perfluoroalkyl, aryl, fluoroaryl or perfluoroaryl;

g) $(N(SO_2R)_x R'_y)^-$ where R is fluoroalkyl, perfluoroalkyl, aryl, fluoroaryl or perfluoroaryl, R' is alkyl, fluoroalkyl, perfluoroalkyl, aryl, fluoroaryl or perfluoroaryl, x+y=2 and x=1 or 2;

h) $(C(SO_2R)_x R'_y)^-$ where R is fluoroalkyl, perfluoroalkyl, aryl, fluoroaryl or perfluoroaryl, R' is hydrogen, alkyl, fluoroalkyl, perfluoroalkyl, aryl, fluoroaryl or perfluoroaryl, x+y=3 and x=1, 2 or 3;

i) $(CB_{11}H_{12-m}X_m)^-$ where m is from 0 to 12, and X is at least one member selected from the group consisting of halogen, alkyl, fluoroalkyl, perfluoroalkyl, aryl, fluoroaryl and perfluoroaryl;

j) $(CB_9H_{10-m}X_m)^-$ where m is from 0 to 10, and X is at least one member selected from the group consisting of halogen, alkyl, fluoroalkyl, perfluoroalkyl, aryl, fluoroaryl and perfluoroaryl; and k) $(CB_{11}F_{11}R)^-$ where R is alkyl, fluoroalkyl, perfluoroalkyl, aryl, fluoroaryl, perfluoroaryl or ammonium.

35. The method of claim 29, wherein said adsorbent is free of CuCl.

* * * * *